US010950129B1

(12) United States Patent
Kourous-Harrigan et al.

(10) Patent No.: US 10,950,129 B1
(45) Date of Patent: Mar. 16, 2021

(54) INFRASTRUCTURE COMPONENT BROADCAST TO VEHICLES

(71) Applicant: Ford Global Technologies, LLC, Dearborn, MI (US)

(72) Inventors: Helen Kourous-Harrigan, Monroe, MI (US); John Lockwood, Howell, MI (US); Mostafa Parchami, Dearborn, MI (US); Matthew Baer Wilmes, Plymouth, MI (US); Faizan Shaik, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/751,326

(22) Filed: Jan. 24, 2020

(51) Int. Cl.
    *G08G 1/04*    (2006.01)
    *G08G 1/16*    (2006.01)
    *G08G 1/01*    (2006.01)
    *G05D 1/02*    (2020.01)
    *G05D 1/00*    (2006.01)

(52) U.S. Cl.
    CPC ............ *G08G 1/161* (2013.01); *G05D 1/028* (2013.01); *G05D 1/0285* (2013.01); *G08G 1/0116* (2013.01); *G08G 1/04* (2013.01); *G05D 1/0088* (2013.01); *G05D 2201/0213* (2013.01)

(58) Field of Classification Search
    None
    See application file for complete search history.

(56) References Cited

U.S. PATENT DOCUMENTS

| 2017/0092126 | A1  | 3/2017 | Oshida et al. |
| 2017/0228948 | A1* | 8/2017 | Albitz ................. G07C 5/0841 |
| 2018/0083914 | A1* | 3/2018 | Yamaura ............... H04L 67/12 |
| 2018/0262865 | A1* | 9/2018 | Lepp ..................... H04W 4/40 |
| 2019/0096246 | A1  | 3/2019 | Zydek et al. |
| 2019/0096249 | A1  | 3/2019 | Swan |
| 2019/0176844 | A1* | 6/2019 | Sedlmayr .............. G08G 1/162 |
| 2020/0086789 | A1* | 3/2020 | Nowakowski ........ G06T 15/503 |

FOREIGN PATENT DOCUMENTS

WO    2018198926 A1   11/2018

OTHER PUBLICATIONS

Sewalkar et al., "Vehicle-to-Pedestrian Communication for Vulnerable Road Users: Survey, Design Considerations, and Challenges", Sensors 2019, 19, 358; doi:10.3390/s19020358, www.mdpi.com/journal/sensors.

* cited by examiner

*Primary Examiner* — John F Mortell
(74) *Attorney, Agent, or Firm* — Frank A. MacKenzie; Bejin Bieneman PLC (57) ABSTRACT

An infrastructure component includes a sensor, a transmitter, and a computer communicatively coupled to the sensor and to the transmitter. The computer is programmed to, in response to receiving data from the sensor indicating an object approaching a predesignated zone, determine an estimated time until the object reaches the predesignated zone; and then instruct the transmitter to broadcast a message to nearby vehicles, the message including an identifier of the predesignated zone and the estimated time.

20 Claims, 3 Drawing Sheets

INFRASTRUCTURE COMPONENT BROADCAST TO VEHICLES

BACKGROUND

Vehicles can be autonomous or semi-autonomous. In an autonomous or semi-autonomous vehicle, a vehicle computer is typically programmed to operate the vehicle independently of the intervention of a human driver, completely or to a lesser degree. The vehicle computer may be programmed to operate the propulsion, brake system, steering, and/or other vehicle systems based on data received from sensors mounted to the vehicle. In some environments, obstacles can obstruct the fields of view of one or more of the sensors, depriving the vehicle of information about objects possibly behind the obstacles.

DETAILED DESCRIPTION

Figure 1:
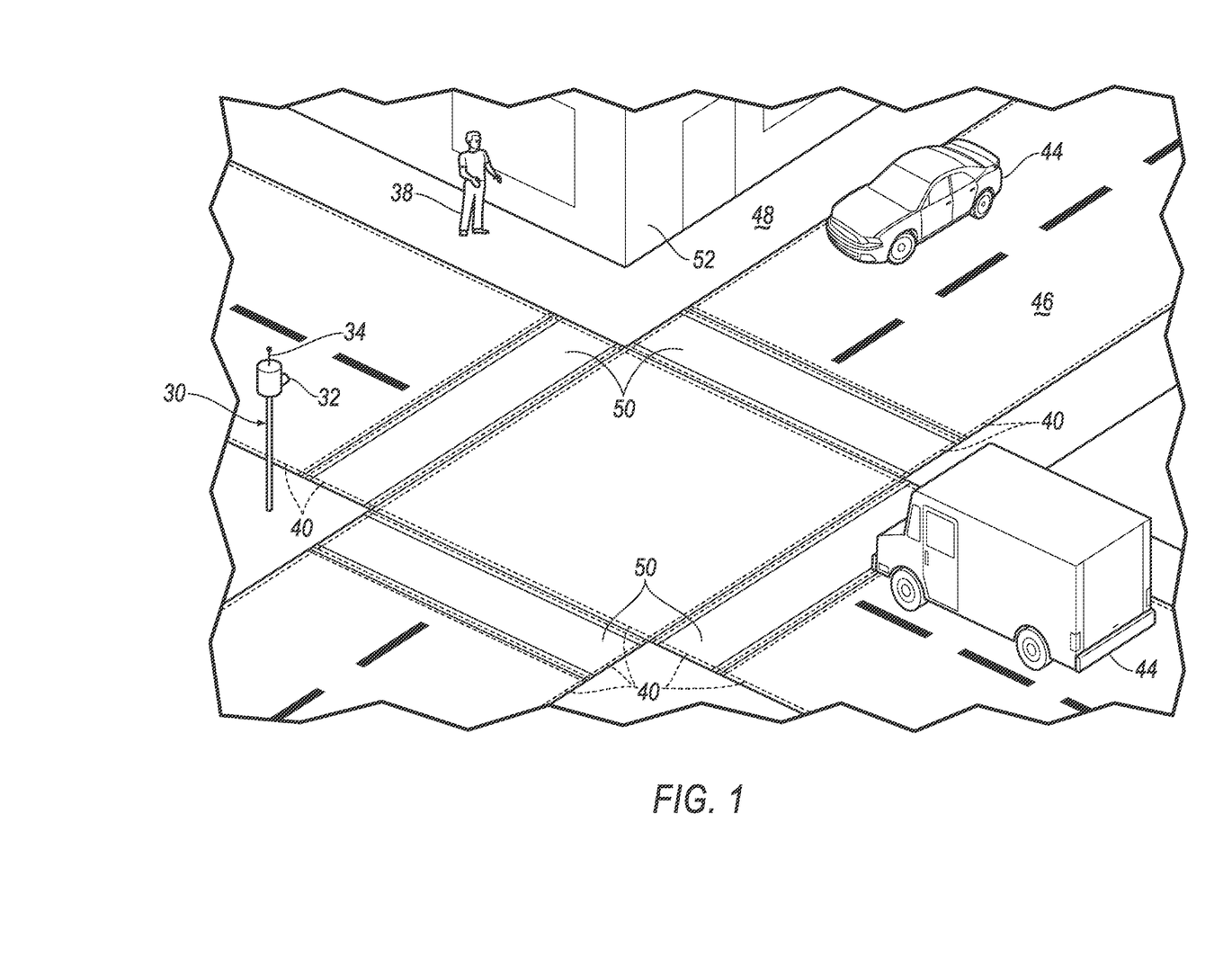
FIG. 1 is a perspective diagram of an environment including an infrastructure component.

An infrastructure component described herein can detect an object in a surrounding environment and broadcast a message receivable by nearby vehicles informing the vehicles about the object. The message permits the vehicles to act to avoid the object even if sensors on the vehicles are obstructed from detecting the object. For example, FIG. 1 shows a pedestrian and a vehicle approaching the same crosswalk with a building blocking the vehicle from detecting the pedestrian. The vehicle can thus be warned about the pedestrian sooner than by relying on the sensors on board the vehicle. As described below, the message includes an identifier for a predesignated zone and an estimated time until the object reaches the predesignated zone. These features of the message can make the message simple for the vehicle to process, which can allow the vehicle to react quickly to the message.

A computer includes a processor and a memory, and the memory stores instructions executable by the processor to, in response to receiving data from a sensor indicating an object approaching a predesignated zone, determine an estimated time until the object reaches the predesignated zone; and then instruct a transmitter to broadcast a message to nearby vehicles, the message including the estimated time and an identifier of the predesignated zone.

The sensor may include at least one of a camera or a LIDAR sensor.

The message may include an indicator specifying that the predesignated zone is at most one of currently occupied or currently unoccupied. The indicator may specify that the predesignated zone is one of currently occupied, currently unoccupied, or unknown occupancy, and the instructions may include to select unknown occupancy as the indicator in response to data from the sensor indicating an obstruction of the view of the sensor of at least some of the predesignated zone.

The predesignated zone may be an area on which a vehicle is capable of operating.

The message may include an indicator of a type of the predesignated zone. The indicator of the type may be one of a plurality of identifiers of types stored in the memory, including identifiers at least for a crosswalk and for a traffic lane.

The predesignated zone may be represented as a polygon.

The message may be a first message; the instructions may further include to, in response to receiving data from the sensor indicating a lack of objects approaching the predesignated zone, instruct the transmitter to broadcast a second message to nearby vehicles; and the second message may indicate the lack of objects approaching the predesignated zone. The instructions may further include to instruct the transmitter to broadcast the first message or the second message at no more than a time threshold after previously broadcasting the first message or the second message.

The instructions may further include to instruct the transmitter to broadcast the second message in response to determining that the estimated time until the object reaches the predesignated zone is greater than a threshold.

The first message and the second message may each include a sequence number equal to one greater than the sequence number of the previous first or second message.

The estimated time may be a first estimated time; the instructions may further include to determine a second estimated time until a set of objects are clear from the predesignated zone; and the message may include the second estimated time.

The instructions may further include to determine an estimated standard deviation of the estimated time, and the message may include the estimated standard deviation.

The message may include the current time.

The message may include a version number specifying a version of data defining the predesignated zone.

An infrastructure apparatus includes a sensor, a transmitter, and a computer communicatively coupled to the sensor and to the transmitter. The computer is programmed to, in response to receiving data from the sensor indicating an object approaching a predesignated zone, determine an estimated time until the object reaches the predesignated zone; and then instruct the transmitter to broadcast a message to nearby vehicles, the message including an identifier of the predesignated zone and the estimated time.

The sensor may include at least one of a camera or a LIDAR sensor.

A method includes, in response to receiving data from a sensor indicating an object approaching a predesignated zone, determining an estimated time until the object reaches the predesignated zone; and then instructing a transmitter to broadcast a message receivable by nearby vehicles, the message including the estimated time and an identifier of the predesignated zone.

With reference to the Figures, an infrastructure component 30 includes a sensor 32, a transmitter 34, and a computer 36 communicatively coupled to the sensor 32 and to the transmitter 34. The computer 36 is programmed to, in response to receiving data from the sensor 32 indicating an object 38 approaching a predesignated zone 40, determine a first estimated time 62 until the object 38 reaches the predesignated zone 40; and then instruct the transmitter 34 to broadcast a message 42 to nearby vehicles 44. The message 42 includes an identifier 58 of the predesignated zone 40 and the first estimated time 62.

With reference to FIG. 1, the infrastructure component 30 is mounted in a fixed position in an environment including one or more roads on which vehicles 44 can travel. The infrastructure component 30 can be positioned to give the sensor 32 a broad view of the environment, e.g., mounted on a streetlight or traffic light.

The environment can include roadways 46 along which vehicles 44 can travel and areas such as sidewalks 48 and crosswalks 50 along which objects 38 such as pedestrians or cyclists can travel. The environment can also include obstructions such as buildings 52 that can prevent vehicles 44 and moving objects 38 from seeing each other. For example, as depicted in FIG. 1, the view from the vehicle 44 to the pedestrian is blocked by the building 52.

The vehicles 44 can be any passenger or commercial automobiles such as cars, trucks, sport utility vehicles, crossovers, vans, minivans, taxis, buses, etc. The vehicles 44 can be autonomous or semi-autonomous. For each vehicle 44, a vehicle computer can be programmed to operate the vehicle 44 independently of the intervention of a human driver, completely or to a lesser degree. The vehicle computer may be programmed to operate the propulsion, brake system, steering, and/or other vehicle systems. For the purposes of this disclosure, autonomous operation means the vehicle computer controls the propulsion, brake system, and steering without input from a human driver; semi-autonomous operation means the vehicle computer controls one or two of the propulsion, brake system, and steering and a human driver controls the remainder; and nonautonomous operation means a human driver controls the propulsion, brake system, and steering.

The operation of the vehicle 44, as embodied by programming in the vehicle computer and/or other onboard controllers, is divided into layers, each of which builds on the output of an immediately underlying layer. For example, the layers can include an onboard perception layer of the data from the sensors, a data fusion layer building on the onboard perception layer, a decision-making layer building on data fusion layer, and a motion planning layer building on the decision-making layer. The data fusion layer turns the output of the onboard perception into a model of the environment in which the vehicle 44 is operating. The decision-making layer determines the actions that the vehicle 44 will take through the environment, e.g., changing lanes, stopping at a red light, turning at an intersection, etc. The motion planning layer determines how the vehicle 44 will move through the environment in order to take the actions determined by the decision-making layer.

Part of the environment around the infrastructure 30, e.g., some or all of the roadways 46, are divided into the predesignated zones 40. The predesignated zones 40 are areas on which a vehicle 44 is capable of operating. For example, traffic lanes, crosswalks 50, and sidewalks 48 can be predesignated zones 40 or parts of predesignated zones 40, and off-road areas and buildings can be outside of the predesignated zones 40. Alternatively and more narrowly, the predesignated zones 40 can be areas designated for operating a vehicle 44. The predesignated zones 40 can each be represented as a polygon, e.g., more specifically as coordinates for vertices of a simple convex polygon. The coordinates are global coordinates, e.g., global positioning system (GPS) coordinates. For example, as shown in FIG. 1, the pedestrian and the vehicle 44 are approaching a predesignated zone 40 encompassing a crosswalk 50, and that predesignated zone 40 is a rectangle. The predesignated zones 40 are nonoverlapping and can border each other.

The predesignated zones 40 can be specified by zone definition data stored in the memory of the computer 36 in the infrastructure component 30 as well as stored in, e.g., vehicle computers onboard the vehicles 44. For example, the infrastructure component 30 can periodically broadcast the zone definition data via the transmitter 34 to the vehicles 44 within range of the transmitter 34. Alternatively or additionally, the zone definition data can already be preloaded onboard the vehicles 44 before the vehicles 44 encounter the environment where the infrastructure component 30 is installed. Thus, the infrastructure component 30 and the vehicles 44 have access to the same information from the zone definition data. The zone definition data includes identifiers 58 for the predesignated zones 40 within the field of view of the sensor 32 paired with the corresponding representations of the predesignated zones 40, e.g., with sets of coordinates representing vertices of the polygons constituting the predesignated zones 40. The zone definition data can also include a representation of the field of view of the sensor 32, e.g., as coordinates for vertices of a polygon.

Figure 2:
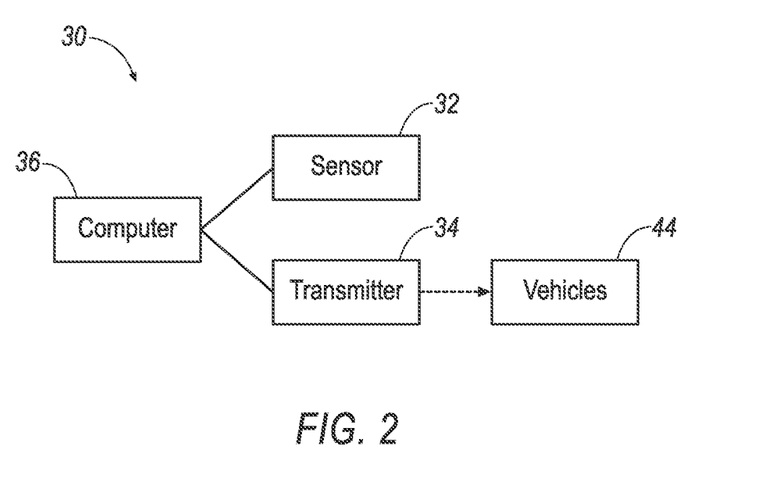
FIG. 2 is a block diagram of the infrastructure component.

With reference to FIG. 2, the computer 36 is a microprocessor-based computing device, e.g., an electronic controller or the like. The computer 36 includes a processor, a memory, etc. The memory of the computer 36 includes media for storing instructions executable by the processor as well as for electronically storing data and/or databases. The computer 36 is communicatively coupled to the sensor 32 and to the transmitter 34, e.g., by a communications bus. The computer 36 can be mounted in the same location as the sensor 32.

The sensor 32 detects the external world, e.g., objects 38 and/or characteristics of the environment, such as the vehicles 44, road lane markings, traffic lights and/or signs, pedestrians, cyclists, other objects, etc. For example, the sensor 32 can be one of a camera or a LIDAR sensor. A LIDAR sensor detects distances to objects by emitting laser pulses at a particular wavelength and measuring the time of flight for the pulse to travel to something in the environment and back. Alternatively, the sensor 32 can include multiple sensors, e.g., a complementary metal-oxide semiconductor (CMOS) camera, an infrared camera, a LIDAR sensor, and a radar sensor.

The transmitter 34 is adapted to transmit signals wirelessly through any suitable wireless communication protocol, such as Dedicated Short-Range Communications (DSRC), cellular vehicle-to-everything (CV2X), other RF (radio frequency) communications, etc. The transmitter 34 can be adapted for broadcasting, i.e., transmitting to many potential recipients without receiving.

Figure 3:
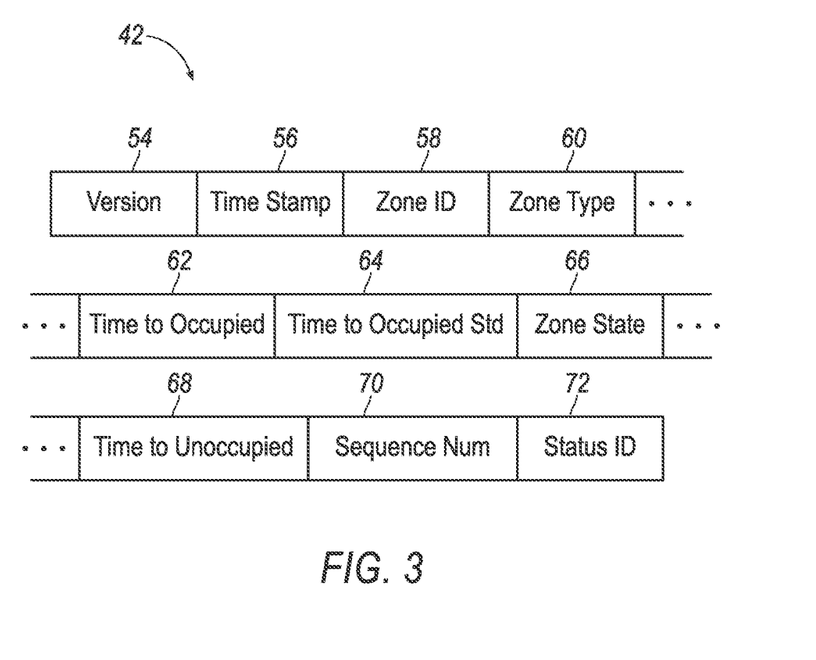
FIG. 3 is a diagram of an example message broadcast by the infrastructure component.

With reference to FIG. 3, the computer 36 generates the message 42 based on data received from the sensor 32 and broadcasts the message 42 to the vehicles 44, according to a process 400 described below. The message 42 includes a version number 54, a current time 56, an identifier 58 for the predesignated zone 40, an indicator 60 of a type of the predesignated zone 40, a first estimated time 62 until the object 38 reaches the predesignated zone 40, an estimated standard deviation 64 of the first estimated time 62, an indicator 66 specifying a current occupancy status of the predesignated zone 40, a second estimated time 68 until all objects 38 are clear from the predesignated zone 40, a sequence number 70, and a status indicator 72 for the message 42, which are explained in turn.

The version number 54 specifies a version of the zone definition data. The vehicle 44 receiving the message 42 can use the version number 54 to verify that the vehicle 44 is using the same zone definition data as the infrastructure component 30 is using.

The current time 56 is the time of day at which the message 42 is sent. The infrastructure component 30 can include a GPS-synchronized local clock, which can provide the current time 56.

The identifier 58 for the predesignated zone 40 specifies to which predesignated zone 40 the message 42 relates. The identifier 58 is the same identifier 58 for that predesignated zone 40 as provided in the zone definition data; thus, the identifier 58 informs the vehicle 44 of the predesignated zone 40 to which the message 42 pertains. The identifier 58 can be an integer value.

The indicator 60 of the type of predesignated zone 40 specifies what use or uses the predesignated zone 40 is for. For example, the types of predesignated zones 40 can include a crosswalk 50, sidewalk 48, traffic lane, bike lane, and/or bus lane. The indicator 60 of the type of the predesignated zone 40 is one of a plurality of identifiers stored in the memory of the computer 36 corresponding to the types. The identifiers can be, for example, integers. For example, the identifiers can be 1 for crosswalk 50, 2 for sidewalk 48, 3 for traffic lane, 4 for bike lane, 5 for bus lane, and 0 for unknown or miscellaneous. The computer 36 stores the indicator 60 of the type of the predesignated zone 40 for all the predesignated zones 40 within the field of view of the sensor 32.

The first estimated time 62 is a time determined in the process 400 below from a current time 56 until a time when an object 38 enters the predesignated zone 40 identified in the message 42. The first estimated time 62 can be represented as an integer in units of milliseconds, e.g., in the range of 1 to 60000 milliseconds. In the field for the first estimated time 62, the message 42 can instead indicate a lack of objects 38 approaching the predesignated zone 40, e.g., by including a zero instead of a positive number. A message 42 including a positive number indicating the first estimated time 62 until the object 38 enters the predesignated zone 40 is referred to as a first message 42a, and a message 42 including a zero indicating a lack of objects 38 approaching the predesignated zone 40 is referred to as a second message 42b.

The first estimated time 62 can provide for reduced processing and faster reaction time by a vehicle 44 receiving the first message 42a than if the message 42 instead included a location and heading for the object 38. Location and heading information could be introduced at the data fusion layer of the operation of the vehicle 44, meaning that the information must be processed at the data fusion and decision-making layers before reaching the motion planning layer. By contrast, the first estimated time 62 can be directly used at the motion planning layer of the operation of the vehicle 44, skipping the processing at lower layers. Thus, computer processing resources in the vehicle 44 can be conserved and/or more efficiently employed.

The estimated standard deviation 64 is a standard deviation of the first estimated time 62 based on a sample of the movement of the object 38 toward the predesignated zone 40 over time. The vehicle 44 can use the standard deviation to account for the possibility of the object 38 arriving to the predesignated zone 40 earlier than the first estimated time 62.

The indicator 66 of the occupancy status specifies whether the predesignated zone 40 is occupied by an object 38 (different than the object 38 approaching the predesignated zone 40) at the current time 56. The indicator 66 specifies that the predesignated zone 40 is at most one of currently occupied or currently unoccupied, e.g., that the predesignated zone 40 is one of currently occupied, currently unoccupied, or unknown occupancy. The indicator 66 can be represented by an integer, e.g., 1 for currently occupied, 2 for currently unoccupied, and 0 for unknown occupancy.

The second estimated time 68 is a time determined in the process 400 below until all objects 38 are clear from the predesignated zone 40. The second estimated time 68 can be represented as an integer in units of milliseconds, e.g., in the range of 1 to 60000 milliseconds. If the message 42 is a second message 42b (i.e., if the field for the first estimated time 62 is zero) and the predesignated zone 40 is currently unoccupied, the field for the second estimated time 68 can be set to zero.

The sequence number 70 specifies the message 42 among all messages 42 sent by the infrastructure component 30. The sequence number 70 is equal to one greater than the sequence number 70 of the previous message 42. After a maximum sequence number 70, the next sequence number 70 can restart at a lowest sequence number 70, e.g., zero.

The status indicator 72 specifies whether the computer 36 has encountered any known, discoverable error states, e.g., a perception stack error, a sensor error, a network error, etc. The status indicator 72 can be a binary indicator, e.g., 0 indicates no known errors, and 1 indicates at least one known error.

Figure 4:
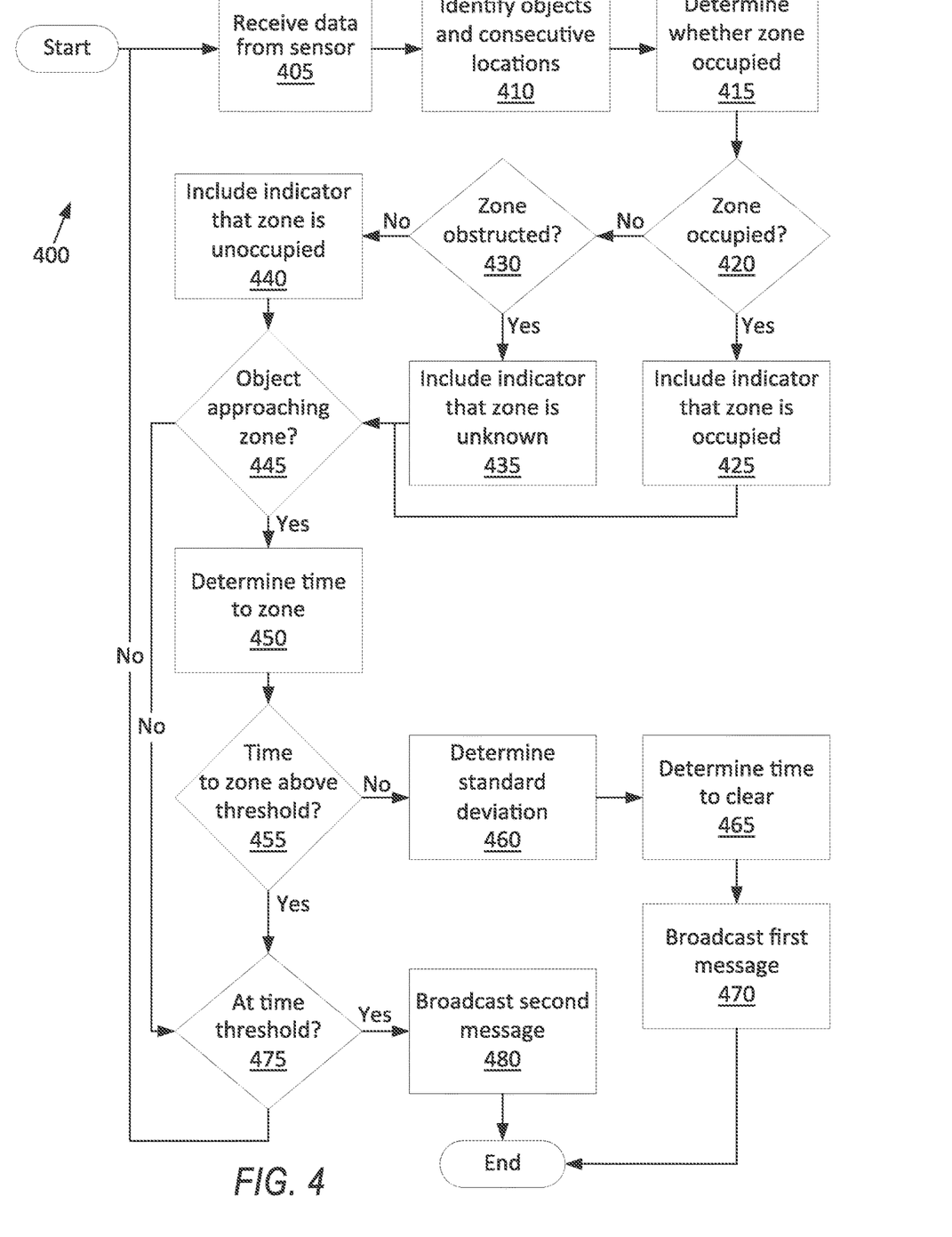
FIG. 4 is a process flow diagram of an example process for broadcasting the message by the infrastructure component.

FIG. 4 is a process flow diagram illustrating the exemplary process 400 for broadcasting the message 42 by the infrastructure component 30. The memory of the computer 36 stores executable instructions for performing the steps of the process 400. The process 400 is performed for one predesignated zone 40 at a time, so references below will be to "the predesignated zone 40" in the singular. As a general overview of the process 400, the computer 36 receives data from the sensor 32; determines whether the predesignated zone 40 is occupied, unoccupied, or unknown; in response to data indicating an object 38 approaching the predesignated zone 40, determines the first estimated time 62 and broadcast the first message 42a to vehicles 44 if the first estimated time 62 is below a time threshold; and in response to data indicating a lack of objects 38 approaching the predesignated zone 40 or the first estimated time 62 being above the time threshold, broadcasts the second message 42b to vehicles 44.

The process 400 begins in a block 405, in which the computer 36 receives data from the sensor 32. The type of data depends on the type of sensor 32. For example, if the sensor 32 is a camera, the data is image data, and if the sensor 32 is a LIDAR sensor, the data is three-dimensional data.

Next, in a block 410, the computer 36 identifies one or more objects 38 and their locations in the environment over successive time increments. The computer 36 can identify each object 38 using conventional image-recognition techniques, e.g., a convolutional neural network programmed to accept images as input and output an identification of the object 38. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer. The final layer of the convolutional neural network generates a score for each potential type for the object 38, and the final output is the type with the highest score. The possible types can include pedestrian, cyclist, vehicle 44, etc. The computer 36 also determines the consecutive locations of the object 38 in the environment by using the three-dimensional data if the sensor 32 is a LIDAR sensor or by the position of the object 38 in pixel coordinates in the image data if the sensor 32 is a camera. For the purposes of this disclosure, "location" is defined as the physical position of the item of interest in the environment. The locations can be represented as coordinates, e.g., absolute coordinates such as GPS coordinates. The computer 36 tracks the locations of the object 38 over successive time increments.

Next, in a block 415, the computer 36 determines whether any objects 38 are located in the predesignated zone 40. The computer 36 determines whether the coordinates for any of the identified objects 38 are inside the polygon representing the predesignated zone 40.

Next, in a decision block 420, the computer 36 determines whether the predesignated zone 40 is occupied. If an object 38 is in the predesignated zone 40 as determined in the block 415, the process 400 proceeds to a block 425. If no objects 38 are in the predesignated zone 40, the process 400 proceeds to a decision block 430.

In the block 425, the computer 36 selects currently occupied, e.g., 1 in the labeling scheme described above, as the indicator 66 for the occupancy status in the message 42. After the block 425, the process 400 proceeds to a decision block 445.

In the decision block 430, the computer 36 determines whether there was an obstruction of the view of the sensor 32 of at least some of the predesignated zone 40, i.e., whether part of an object 38 was directly between the sensor 32 and the predesignated zone 40. For example, with image data from the sensor 32, the computer 36 can determine whether a boundary in pixel dimensions of the object 38 intersects a boundary in pixel dimensions of the predesignated zone 40. If the predesignated zone 40 is obstructed, the process 400 proceeds to a block 435. If the predesignated zone 40 is unobstructed, the process 400 proceeds to a block 440.

In the block 435, the computer 36 selects unknown occupancy, e.g., 0 in the labeling scheme described above, as the indicator 66 for the occupancy status in the message 42. After the block 435, the process 400 proceeds to the decision block 445.

In the block 440, the computer 36 selects currently unoccupied, e.g., 2 in the labeling scheme described above, as the indicator 66 for the occupancy status in the message 42. After the block 440, the process 400 proceeds to the decision block 445.

In the decision block 445, the computer 36 determines from the data from the sensor 32 whether any of the objects 38 are approaching the predesignated zone 40. For example, the computer 36 can determine a trajectory from the successive locations of an object 38 over time, e.g., by fitting a straight line to the successive locations, and then determine whether extending the trajectory intersects the polygon representing the predesignated zone 40. If any of the objects 38 are approaching the predesignated zone 40, the process 400 proceeds to a block 450. If there is a lack of objects 38 approaching the predesignated zone 40, the process 400 proceeds to a decision block 475.

In the block 450, the computer 36 determines the first estimated time 62 until the object 38 reaches the predesignated zone 40. If there are multiple objects 38 approaching the predesignated zone 40, the computer 36 determines estimated times for each object 38 and selects the shortest estimated time as the first estimated time 62. The computer 36 determines the first estimated time 62 for an object 38 by determining an average speed v for the object 38 along the trajectory determined in the decision block 445, determining a current distance d of the object 38 from the predesignated zone 40 along the trajectory, and dividing the current distance d by the average speed v, i.e., $T_1 = d/v$. The average speed v is determined by averaging the speeds $v_i$ along the trajectory for all the successive locations $L_0$ to $L_N$, i.e., $v = (v_1 + \ldots + v_N)/N$. The speed $v_i$ between two successive locations $L_{i-1}$, $L_i$ is a distance along the trajectory between the successive locations $L_{i-1}$, $L_i$ divided by the time increment $t_i$ between when the object 38 was at the two successive locations $L_{i-1}$, $L_i$. The current distance d is measured along the trajectory from the current location $L_N$ to the point at which the trajectory enters the predesignated zone 40.

Next, in a decision block 455, the computer 36 determines whether the first estimated time 62 until the object 38 reaches the predesignated zone 40 is greater than a threshold. The threshold is chosen, e.g., via empirical testing or simulation, to be sufficiently high that a vehicle 44 receiving the message 42 will not need to brake for the object 38 before receiving multiple succeeding messages 42, e.g., 1 minute, i.e., 60000 milliseconds. If the first estimated time 62 is below the threshold, the process 400 proceeds to a block 460. If the first estimated time 62 is above the threshold, the process 400 proceeds to the decision block 475.

In the block 460, the computer 36 determines an estimated standard deviation 64 of the first estimated time 62. The data for calculating the standard deviation is the set of the speeds $v_i$ along the trajectory for the successive locations $L_0$ to $L_N$. The formula is $$\sigma = \sqrt{\frac{\sum_{i=1}^{N}(v_i - v)^2}{N}}$$

The standard deviation has the same units as the first estimated time 62.

Next, in a block 465, the computer 36 determines the second estimated time 68 until a set of the objects 38 are clear from the predesignated zone 40. The set of objects 38 can include all the objects 38 currently in the predesignated zone 40, and the set can also include the object 38 approaching the predesignated zone 40 if the object 38 will enter the predesignated zone 40 before the objects 38 currently in the predesignated one 40 are clear from the predesignated zone 40. The computer 36 determines a time-to-exit $T_2$ for each object 38 by using the average speed v for the object 38 as determined in the block 450, determining a current distance d' of the object 38 from exiting the predesignated zone 40 along the trajectory, and dividing the current distance d' by the average speed v, i.e., $T_2 = d'/v$. The current distance d' is measured along the trajectory from the current location $L_N$ past the point at which the trajectory enters the predesignated zone 40 to the point at which the trajectory exits the predesignated zone 40. The computer 36 compares the longest time-to-exit $T_2$ for the objects 38 currently in the predesignated zone 40 to the first estimated time 62. (If multiple objects 38 are approaching the predesignated zone 40, the computer 36 uses the shortest first estimated time 62.) If the longest time-to-exit $T_2$ is longer than the first estimated time 62, i.e., if all the objects 38 in the predesignated zone 40 will clear before the approaching object 38 reaches the predesignated zone 40, then the second estimated time 68 is the longest time-to-exit $T_2$ of the objects 38 currently in the predesignated zone 40. If the first estimated time 62 is longer than the longest time-to-exit $T_2$, i.e., the approaching object 38 will enter the predesignated zone 40 before all the objects 38 exit, then the second estimated time 68 is the time-to-exit $T_2$ of the approaching object 38.

Next, in a block 470, the computer 36 instructs the transmitter 34 to broadcast the first message 42a to nearby vehicles 44. The first message 42a includes the version number 54, the current time 56, the identifier 58 for the predesignated zone 40, the indicator 60 of the type of the predesignated zone 40, the first estimated time 62 as determined in the block 450, the estimated standard deviation 64 as determined in the block 460, the indicator 66 specifying the occupancy status from the block 425, 435, or 440, the second estimated time 68 as determined in the block 465, the sequence number 70, and the status indicator 72. After the block 470, the process 400 ends.

In the decision block 475, the computer 36 determines whether the current time 56 is later than the time at which the most recent message 42 was broadcast by at least a time threshold. The time threshold is chosen to be sufficiently short that a vehicle 44 will receive multiple messages 42 between entering a range of the transmitter 34 and crossing the predesignated zone 40. If the time since the most recent message 42 is shorter than the time threshold, the process 400 returns to the block 405 to restart the process 400. If the time since the most recent message 42 is at least as long as the time threshold, the process 400 proceeds to a block 480.

In the block 480, the computer 36 instructs the transmitter 34 to broadcast the second message 42b to nearby vehicles 44. The second message 42b includes the version number 54, the current time 56, the identifier 58 for the predesignated zone 40, the indicator 60 of the type of the predesignated zone 40, a zero in the field for the first estimated time 62, a zero in the field for the estimated standard deviation 64, the indicator 66 specifying the occupancy status from the block 425, 435, or 440, a zero in the field for the second estimated time 68, the sequence number 70, and the status indicator 72. The zero in the field for the first estimated time 62 indicates a lack of objects 38 approaching the predesignated zone 40, at least within the threshold of the decision block 455. Because the second message 42b is broadcast at no more than the time threshold since the next most recent message 42, a vehicle 44 can determine whether the infrastructure component 30 is operating based on whether the vehicle 44 receives a message 42. After the block 480, the process 400 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated there-with (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:
    in response to receiving data from a sensor indicating an object approaching a predesignated zone, determine an estimated time until the object reaches the predesignated zone;
    then instruct a transmitter to broadcast a message to nearby vehicles, the message including the estimated time an identifier of the predesignated zone, and an indicator specifying that the predesignated zone is one of currently occupied, currently unoccupied, or unknown occupancy; and
    select unknown occupancy as the indicator in response to data from the sensor indicating an obstruction of the view of the sensor of at least some of the predesignated zone.

2. The computer of claim 1, wherein the sensor includes at least one of a camera or a LIDAR sensor.

3. The computer of claim 1, wherein the predesignated zone is an area on which a vehicle is capable of operating.

4. The computer of claim 1, wherein the message includes an indicator of a type of the predesignated zone.

5. The computer of claim 4, wherein the indicator of the type is one of a plurality of identifiers of types stored in the memory, including identifiers at least for a crosswalk and for a traffic lane.

6. The computer of claim 1, wherein the predesignated zone is represented as a polygon.

7. The computer of claim 1, wherein:
    the message is a first message;
    the instructions further include to, in response to receiving data from the sensor indicating a lack of objects approaching the predesignated zone, instruct the transmitter to broadcast a second message to nearby vehicles; and
    the second message indicates the lack of objects approaching the predesignated zone.

8. The computer of claim 7, wherein the instructions further include to instruct the transmitter to broadcast the first message or the second message at no more than a time threshold after previously broadcasting the first message or the second message.

9. The computer of claim 7, wherein the instructions further include to instruct the transmitter to broadcast the second message in response to determining that the estimated time until the object reaches the predesignated zone is greater than a threshold.

10. The computer of claim 7, wherein the first message and the second message each include a sequence number equal to one greater than the sequence number of the previous first or second message.

11. The computer of claim 1, wherein:
    the estimated time is a first estimated time;
    the instructions further include to determine a second estimated time until a set of objects are clear from the predesignated zone; and
    the message includes the second estimated time.

12. The computer of claim 1, wherein the instructions further include to determine an estimated standard deviation of the estimated time, and the message includes the estimated standard deviation.

13. The computer of claim 1, wherein the message includes the current time.

14. The computer of claim 1, wherein the message includes a version number specifying a version of data defining the predesignated zone.

15. An infrastructure apparatus comprising:
    a sensor;
    a transmitter; and
    a computer communicatively coupled to the sensor and to the transmitter, the computer programmed to:
      in response to receiving data from the sensor indicating an object approaching a predesignated zone, determine an estimated time until the object reaches the predesignated zone;
      then instruct the transmitter to broadcast a message to nearby vehicles, the message including an identifier of the predesignated zone the estimated time, and an indicator specifying that the predesignated zone is one of currently occupied, currently unoccupied, or unknown occupancy; and
      select unknown occupancy as the indicator in response to data from the sensor indicating an obstruction of the view of the sensor of at least some of the predesignated zone.

16. The infrastructure apparatus of claim 15, wherein the sensor includes at least one of a camera or a LIDAR sensor.

17. The infrastructure apparatus of claim 15, wherein the computer is programmed to determine an estimated standard deviation of the estimated time, and the message includes the estimated standard deviation.

18. A computer comprising a processor and a memory, the memory storing instructions executable by the processor to:
    in response to receiving data from a sensor indicating an object approaching a predesignated zone, determine an estimated time until the object reaches the predesignated zone;
    determine an estimated standard deviation of the estimated time; and after determining the estimated time, instruct a transmitter to broadcast a message to nearby vehicles, the message including the estimated time, an identifier of the predesignated zone, and the estimated standard deviation.

19. The computer of claim 18, wherein the message includes an indicator specifying that the predesignated zone is at most one of currently occupied or currently unoccupied.

20. The computer of claim 19, wherein the indicator specifies that the predesignated zone is one of currently occupied, currently unoccupied, or unknown occupancy, and the instructions further include to select unknown occupancy as the indicator in response to data from the sensor indicating an obstruction of the view of the sensor of at least some of the predesignated zone.

* * * * *